(12) United States Patent
Rockenfeller et al.

(10) Patent No.: US 8,278,778 B2
(45) Date of Patent: *Oct. 2, 2012

(54) HVAC/R BATTERY BACK-UP POWER SUPPLY SYSTEM HAVING A VARIABLE FREQUENCY DRIVE (VFD) POWER SUPPLY

(75) Inventors: Uwe Rockenfeller, Boulder City, NV (US); Paul Sarkisian, Boulder City, NV (US); Kaveh Khalili, Boulder City, NV (US); Warren Harhay, Boulder City, NV (US)

(73) Assignee: Rocky Research, Boulder City ( * ) Notice: Subject to any disclaimer, the term of this patent is extended or adjusted under 35 U.S.C. 154(b) by 480 days.

This patent is subject to a terminal disclaimer.

(21) Appl. No.: 12/510,139

(22) Filed: Jul. 27, 2009

(65) Prior Publication Data

US 2011/0018348 A1  Jan. 27, 2011

(51) Int. Cl.
*H02J 1/00* (2006.01)

(52) U.S. Cl. ......... 307/30; 318/110; 318/801; 62/228.4; 165/58

(58) Field of Classification Search .................. None
See application file for complete search history.

(56) References Cited

U.S. PATENT DOCUMENTS

| | | | |
|---|---|---|---|
| 3,424,916 A | 1/1969 | Fenley | |
| 3,877,243 A * | 4/1975 | Kramer | 62/180 |
| 4,006,603 A | 2/1977 | Miles | |
| 4,340,823 A | 7/1982 | Miyazawa | |
| 4,665,707 A | 5/1987 | Hamilton | |
| 4,694,236 A | 9/1987 | Upadhyay et al. | |
| 4,893,479 A * | 1/1990 | Gillett et al. | 62/213 |
| 5,675,982 A | 10/1997 | Kirol et al. | |
| 5,718,125 A | 2/1998 | Pfister et al. | |
| 5,874,788 A | 2/1999 | McCartney | |
| 5,927,598 A | 7/1999 | Broe | |
| 5,929,538 A | 7/1999 | O'Sullivan et al. | |
| 5,977,659 A | 11/1999 | Takehara et al. | |
| 6,005,362 A | 12/1999 | Enjeti et al. | |
| 6,094,034 A | 7/2000 | Matsuura | |
| 6,219,623 B1 * | 4/2001 | Wills | 702/60 |

(Continued)

FOREIGN PATENT DOCUMENTS

EP  901218  3/1999

(Continued)

OTHER PUBLICATIONS

WO 2007046330 to Kudo et al., english translation, Apr. 26, 2007.*

(Continued)

*Primary Examiner* — Rexford Barnie
*Assistant Examiner* — Justen Fauth
(74) *Attorney, Agent, or Firm* — Knobbe Martens Olson & Bear, LLP (57) ABSTRACT

A power supply for an HVAC/R system is configured to provide back-up power functionality for situations when the main source of power fails. The power supply includes a DC power bus which receives power from the main source of power as well as a back up source. When the main source fails the back up source provides power to the DC power bus. Connected to the DC power bus is a variable frequency drive power supply (VFD). The VFD is configured to provide power to the components of the HVAC/R system based on power received from the DC power bus.

20 Claims, 5 Drawing Sheets

U.S. PATENT DOCUMENTS

| | | | |
|---|---|---|---|
| 6,242,883 | B1 | 6/2001 | Strunk |
| 6,257,007 | B1 | 7/2001 | Hartman |
| 6,304,006 | B1 | 10/2001 | Jungreis |
| 6,316,895 | B1 | 11/2001 | Ramarathnam |
| 6,471,013 | B2 | 10/2002 | Banno et al. |
| 6,639,373 | B2 | 10/2003 | Knight et al. |
| 6,710,573 | B2 * | 3/2004 | Kadah ............................ 318/727 |
| 6,843,064 | B2 | 1/2005 | Khalili et al. |
| 6,847,130 | B1 | 1/2005 | Belehradek et al. |
| 7,151,328 | B2 | 12/2006 | Bolz et al. |
| 7,332,885 | B2 | 2/2008 | Schnetzka et al. |
| 7,495,410 | B2 * | 2/2009 | Zargari et al. .................. 318/729 |
| 2003/0048006 | A1 | 3/2003 | Shelter, Jr. et al. |
| 2004/0046458 | A1 | 3/2004 | MacKay |
| 2004/0095091 | A1 | 5/2004 | McNulty et al. |
| 2004/0245949 | A1 | 12/2004 | Ueda et al. |
| 2005/0006958 | A1 | 1/2005 | Dubovsky |
| 2006/0103342 | A1 | 5/2006 | Mechi |
| 2006/0130504 | A1 * | 6/2006 | Agrawal et al. ............... 62/228.4 |
| 2006/0196203 | A1 * | 9/2006 | Schnetzka et al. ............ 62/228.4 |
| 2006/0208687 | A1 | 9/2006 | Takeoka et al. |
| 2007/0114962 | A1 | 5/2007 | Grbovic |
| 2008/0008604 | A1 * | 1/2008 | Tolbert .......................... 417/364 |

FOREIGN PATENT DOCUMENTS

| | | |
|---|---|---|
| EP | 1057236 | 4/2004 |
| GB | 1287648 | 9/1972 |
| GB | 2354378 | 3/2001 |
| JP | 43-64372 | 12/1992 |
| JP | 51-57330 | 6/1993 |
| JP | 52-76690 | 10/1993 |
| JP | 53-24106 | 12/1993 |
| JP | 72-39672 | 9/1995 |
| JP | 91-68299 | 6/1997 |
| JP | 2005-210869 | 8/2005 |
| JP | 2008-048568 | 2/2008 |
| WO | WO 98/02695 | 1/1998 |
| WO | WO 2005/020407 | 3/2005 |

OTHER PUBLICATIONS

Buchholz, Energy efficiency improvements in commercial cooling applications, Sanken Technical Report, 2002, vol. 34, Issue 1, pp. 47-50.

Holtz et al., A high-power multitransistor-inverter uninterruptable power supply system, IEEE Transactions on Power Electronics, Jul. 1988, vol. 3, Issue 3, pp. 278-285.

Mallinson, "Plug and play" single chip controllers for variable speed induction motor drives in white goods and HVAC systems, Thirteenth Annual Applied Power Electronics Conference and Exposition, Feb. 19, 1998, vol. 2, pp. 756-762.

Manz, Applying adjustable speed drives (ASDs) to 3 phase induction NEMA frame motors, Proceedings of 38th Cement Industry Technical Conference, Apr. 14, 1996, pp. 71-78.

Matsui et al., Improvement of transient response of thermal power plant using VVVF inverter, International Conference on Power Electronics and Drive Systems, Nov. 27, 2007, pp. 1209-1214.

Meenakshi et al., Intelligent controller for a stand-alone hybrid generation system, 2006 IEEE Power India Conference, Apr. 10, 2006, pp. 8.

Muntean et al., Variable speed drive structures and benefits in cooling tower fans applications, Dept. of Electr. Eng., Univ. Politehnica of Timisoara, Romania WSEAS Transactions on Systems, Apr. 2007, vol. 6, Issue 4, pp. 766-771.

Nelson et al., Basics and advances in battery systems, IEEE Transactions on Industry Applications, Mar. 1995, vol. 31, Issue 2, pp. 419-428.

Prest et al., Development of a three-phase variable speed drive system for a battery fed underground mining locomotive, Third International Conference on Power Electronics and Variable-Speed Drives, Jul. 13, 1988, pp. 233-236.

Stefanovic, Adjustable speed drives: Applications and R&D needs; Department of Energy, Washington, DC. Report No. ORNL/SUB-80-SN772, Sep. 1995.

Sukumara et al., Fuel cell based uninterrupted power sources, International COnference on Power Electronics and Drive Systems, May 26, 1997, vol. 2, pp. 728-733.

Suryawanshi et al., High power factor operation of a three-phase rectifier for an adjustable-speed drive, IEEE Transactions on Industrial Electronics, Apr. 2008, vol. 55, Issue 4, pp. 1637-1646.

Thoegersen et al., Adjustable Speed Drives in the Next Decade: Future Steps in Industry and Academia, Electric Power Components and Systems, 2004, vol. 32, Issue 1, pp. 13-31.

Tolbert et al., A bi-directional DC-DC converter with minimum energy storage elements, Conference Record of the Industry Applications Conference, 2002., Oct. 13, 2002, vol. 3, pp. 1572-1577.

Tracy et al., Achieving high efficiency in a double conversion transformerless UPS, IECON 2005, Nov. 6, 2005, pp. 4.

Welchko et al., A novel variable frequency three-phase induction motor drive system using only three controlled switches, Thirty-Fifth IAS Annual Meeting and World Conference on Industrial Applications of Electrical Energy, Oct. 8, 2000, vol. 3, pp. 1468-1473.

Yang Kuan-Hsiung et al., An improved assessment model of variable frequency-driven direct expansion air-conditioning system in commercial buildings for Taiwan green building rating system, Taiwan Building and environment, 2007, vol. 42, Issue 10, pp. 3582-3588.

Yuan et al., Integrated uninterruptible DC converter with low input distortion and wide regulation capability, Fifth International Conference on Power Electronics and Variable-Speed Drives, Oct. 26, 1994, pp. 638-644.

Yuedong Zhan et al., Development of a single-phase high frequency UPS with backup PEM fuel cell and battery, International Conference on Electrical Machines and Systems, Oct. 8, 2007, pp. 1840-1844.

* cited by examiner

HVAC/R BATTERY BACK-UP POWER SUPPLY SYSTEM HAVING A VARIABLE FREQUENCY DRIVE (VFD) POWER SUPPLY

BACKGROUND

Heating, ventilation, air conditioning, and refrigeration (HVAC/R) systems generally operate according to AC power received from an AC utility power source, such as an AC mains. Accordingly, an HVAC/R system is generally shut down if the power source fails. When an HVAC/R system is used to cool food markets, restaurants, warehouses, cold storage lockers, etc. in which perishable goods such as fresh produce, dairy products, and meats are held, or pharmacies, hospitals, and other medical facilities where temperature sensitive medicines, drugs and the like are held, shutting down the system may result in spoilage of the goods and significant economic loss.

SUMMARY OF THE INVENTION

Described herein is an HVAC/R power supply system. The HVAC/R system includes a power bus, a power input configured to receive power from a first power source and to supply power to the power bus, a second power source, where the second power source is configured to increase power output to the power bus as a result of a reduction in power output to the power bus from the first power source, and a variable frequency drive inverter power supply (VFD). The VFD is configured to generate a power output for the HVAC/R system according to power received from the power bus, where the power output remains substantially uninterrupted as the first power source reduces power supplied to the power bus.

In some embodiments, an HVAC/R system includes a power bus, a power input configured to receive power from a first power source and to supply power to the power bus, and a second power source. The second power source is configured to increase power output to the power bus as a result of a reduction in power output to the power bus from the first power source. The system also includes a variable frequency drive inverter power supply (VFD), configured to generate a power output for the HVAC/R system according to power received from the power bus, where the power output remains substantially uninterrupted as the first power source reduces power supplied to the power bus, a compressor configured to receive power from the power bus, a condenser, an evaporator, and a refrigerant loop. The refrigerant loop includes piping for directing refrigerant from the compressor to the condenser and from the condenser to the evaporator, and a pulsed operation control valve in the piping for controlling refrigerant flow to the evaporator.

In some embodiments, a method of configuring an HVAC/R power supply system includes connecting first and second power sources to a power bus, where the second power source is configured to increase power output to the power bus as a result of a reduction in power output to the power bus from the first power source, and connecting a variable frequency drive inverter power supply (VFD) to the power bus, where the VFD is configured to generate a power output for the HVAC/R system according to power received from the power bus, where the power output remains substantially uninterrupted as the first power source reduces power supplied to the power bus.

DETAILED DESCRIPTION

Figure 4:
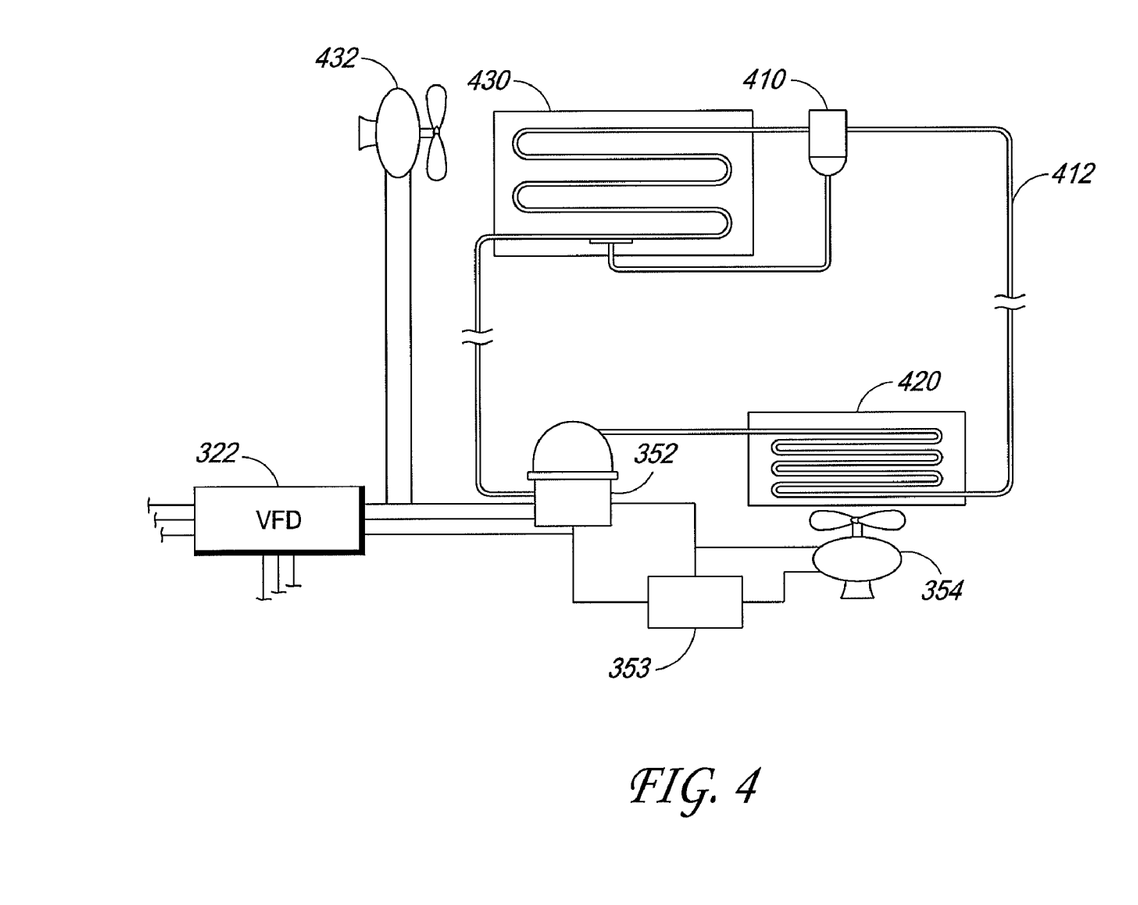
FIG. 4 is a schematic illustration of a vapor compression section of an HVAC/R system.

To provide uninterrupted power to an existing HVAC/R system, the power supply system for the HVAC/R components may be configured, such that, rather than receiving power directly from an AC utility source, the HVAC/R system components receive power from a back-up power storage device, for example, a DC battery in parallel with power from the AC utility source. In the system, the AC utility source provides power to the power storage device and to the main DC power bus of the HVAC/R system through a rectifier. The DC power bus is used to provide power to power supply components which generate appropriate AC power for the HVAC/R system components, such as the compressor motor, condenser fan, and the evaporator fan or blower. In such a configuration, should the AC utility source fail, the DC power bus is powered by the power storage device. An embodiment with an evaporator fan 432 is shown in FIG. 4.

In some embodiments, an HVAC/R system includes a compressor motor and a condenser fan driven with the same power supply, such as a variable frequency drive power supply (VFD). The VFD chops the DC voltage from the DC power bus into three outputs 120 degrees out of phase, which the motors driven see as AC. The VFD allows for efficient start up of the motors being driven, as will be discussed in more detail below. The HVAC/R system allows for automatic, unattended operation during power disruptions because of a transparent transition from AC mains power to back-up power.

Figure 1:
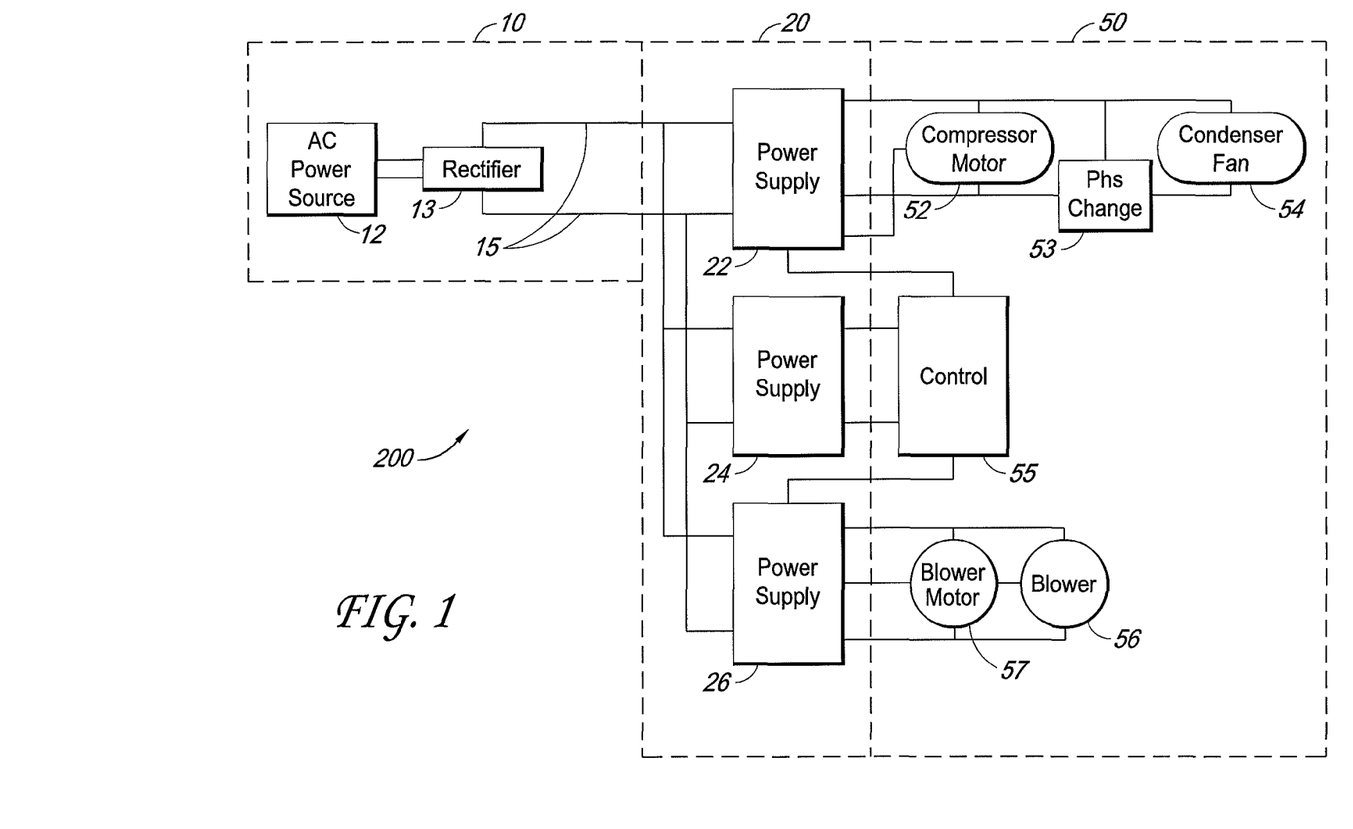
FIG. 1 is a schematic block diagram illustrating an embodiment of a power supply system for an HVAC/R system.

FIG. 1 is a diagram of an embodiment of an HVAC/R system incorporating the power supply system of the invention. The HVAC/R system 200 includes a power source section 10, a power supply section 20, and an HVAC/R component section 50. The power source section 10 includes power sources which provide power to the HVAC/R system 200. The power supply section 20 includes power supplies which receive power from the power source section 10 and condition the power for use by the HVAC/R components of the HVAC/R component section 50. The HVAC/R components of the HVAC/R component section 50 perform HVAC/R functions of the HVAC/R system.

In the embodiment of FIG. 1, the power source section 10 includes a first power source 12, a rectifier 13, a power bus 15, and a second power source 14. In this embodiment, the first power source 12 is an AC power source and provides power to the rectifier 13, which provides substantially DC power to the power bus 15 and charges the second power source 14. In alternative embodiments, the first power source 12 may be a DC power source, which provides DC power to the power bus 15. Accordingly, in such embodiments, the rectifier 13 is omitted. The second power source 14 is also configured to provide power to the power bus 15.

Figure 2:
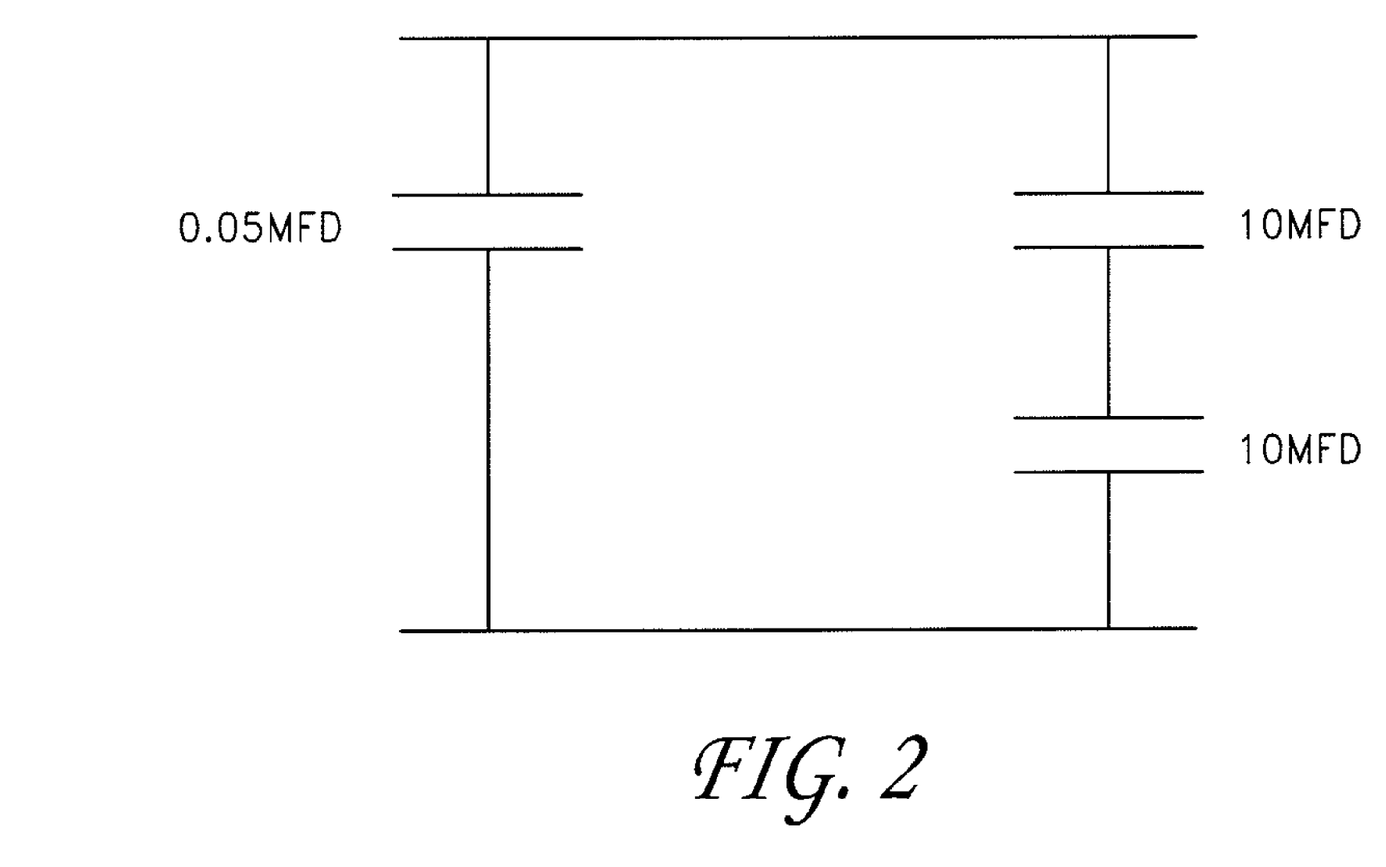
FIG. 2 is a schematic diagram illustrating a phase change module embodiment.

Power source 12 may be any type of power source. In the embodiment of FIG. 2, power source 12 is an AC power source. Power source 12, for example, may be an AC mains, such as that provided by the local power company. Power source 12 may have, for example, one or three phases. In some embodiments, power source 12 is a three-phase, about 240V, AC source. Another power source, such as a solar or a wind power generator may be additionally or alternatively used.

Rectifier 13 is configured to receive AC power from the first power supply 13, to rectify the power signal to a substantially DC level, and to provide the DC level to the power bus 15 appropriate for the system.

Second power source 14 may be a secondary or back-up power source, for example, a battery or a battery pack, configured to be charged. Other types of energy storage devices may also be used. The second power source 14 is connected to the power bus 15, and is configured to be charged by the power bus 15 when the first power source 12 is functioning and the second power source 14 is not fully charged. The second power source 14 is further configured to provide power to the power bus 15 when the power from the rectifier 13 or the first power source 12 is insufficient for the load on the power bus 15.

To limit the amount of charging current flowing to the second power source 14, a current limiting circuit (not shown) may be placed between the power bus 15 and the second power source 14. Such a current limiting circuit limits the current charging the second power source 14 according to the limitation and specification of the second power source 14 so that the second power source 14 is not damaged while being charged.

As an example, an HVAC/R system may be powered by being connected to the power source section 10. The first power source 12 provides power to the DC power bus 15 which is used to operate the HVAC/R system. The second power source 14 stores power from the first power source 12 for use in the case of a failure of the first power source 12. Accordingly, the DC power bus 15 is used to provide power to the HVAC/R system, and to charge and float the second power source 14.

The second power source 14 is configured to increase power output to the power bus 15 as a result of a reduction in power output to the power bus 15 from the first power source 12. For example, if the first power source 12 reduces its power output, such that it provides some, but less than sufficient power to the power bus 15 for the HVAC/R system, the second power source 14 provides the additional supplemental power to the power bus 15 needed to operate the HVAC/R system. Accordingly, the first and second power sources 12 and 14 cooperatively provide the power to the power bus 15 required by the HVAC/R system. The second power source 14 may also be capable of providing sufficient power to the HVAC/R system even if the first power source 12 completely fails and provides no power to the power bus 15. In some embodiments, the total power cooperatively provided to the HVAC/R system by the combination of the first and second power sources 12 and 14 remains uninterrupted or substantially uninterrupted as the amount of power provided by each of the first and second power sources 12 and 14 changes.

The power supply section 20 includes power supplies which receive power from the power source section 10 and condition the power for use by the HVAC/R components of the HVAC/R component section 50. In the embodiment of FIG. 1, there are three power supplies 22, 24, and 26. In other embodiments, fewer or more power supplies are used. Each of the power supplies of the power supply section 20 are used to supply power to one or more of a plurality of components of the HVAC/R component section 50. In the embodiment shown, each of the power supplies 22, 24, and 26 are connected to the power bus 15.

In this embodiment, power supply 22 is configured to supply power to two motors: compressor motor 52 and the motor of condenser fan 54. Power supply 24 is also configured to supply power to control module 55, and power supply 26 is configured to supply power to the motor 57 of blower 56. Although shown separately, rectifier 13 may be integrated with power supply 22.

In one embodiment, power supply 22 is a 10 hp variable frequency drive power supply (VFD). In some embodiments, the VFD comprises the power supply 22 and the rectifier 13. A VFD may be used because of increased power efficiency achieved through controlled start up of the compressor motor 52. When a constant frequency and voltage power supply, such as an AC mains power supply, is used, inrush current to start a motor may be six to ten times the running current. Because of system inertia, the compressor motor is not powerful enough to instantaneously drive the load at full speed in response to the high frequency and high speed signal of the power supply signal needed at full-speed operation. The result is that the motor goes through a start-up phase where the motor slowly and inefficiently transitions from a stopped state to full speed. During start up, some motors draw at least 300% of their rated current while producing less than 50% of their rated torque. As the load of the motor accelerates, the available torque drops and then rises to a peak while the current remains very high until the motor approaches full speed. The high current wastes power and degrades the motor. As a result, overall efficiency, effectiveness, and lifetime of the motor are reduced.

When a VFD is used to start a motor, a low frequency, low voltage power signal is initially applied to the motor. The frequency may be about 2 Hz or less. Starting at such a low frequency allows the load to be driven within the capability of the motor, and avoids the high inrush current that occurs at start up with the constant frequency and voltage power supply. The VFD is used to increase the frequency and voltage with a programmable time profile which keeps the acceleration of the load within the capability of the motor. As a result, the load is accelerated without drawing excessive current. This starting method allows a motor to develop about 150% of its rated torque while drawing only 50% of its rated current. As a result, the VFD allows for reduced motor starting current from either the AC power source 12 or the DC power source 14, reducing operational costs, placing less mechanical stress on the compressor motor 52, and increasing service life. The VFD also allows for programmable control of acceleration and deceleration of the load.

The VFD of power supply 22 is controlled by control module 55, and produces a three-phase output, which powers the compressor motor 52, a three-phase motor. The compressor motor 52 has rotational symmetry of rotating magnetic fields such that an armature is magnetized and torque is developed. By controlling the voltage and frequency of the three-phase power signal, the speed of the motor is controlled whereby the proper amount of energy enters the motor windings so as to operate the motor efficiently while meeting the demand of the accelerating load. Electrical motive is generated by switching electronic components to derive a voltage waveform which, when averaged by the inductance of the motor, becomes the sinusoidal current waveform for the motor to operate with the desired speed and torque. The controlled start up of compressor motor 52 described above allows for high power efficiency and long life of compressor motor 52.

Use of a VFD to power the compressor motor 52 allows for speed control, removing the limitation on the system to be either fully on or off. For example, an HVAC/R system with a VFD can operate the compressor at a speed corresponding to the cooling requirements of the environment having its temperature controlled. For example, if the controlled environment generates 500 watts of power, the compressor can be operated at a speed that corresponds to the heat generated by the 500 watts. This allows for improved power efficiency in the system because power inefficiencies experienced with repeatedly starting and stopping the compressor is avoided.

Furthermore, in some controlled environments, such as well insulated spaces, the heat generated is relatively constant. Accordingly, the energy to be removed is relatively constant. For such environments, the compressor motor may be designed for operation according to the load corresponding to the relatively constant energy to be removed. Such limited range of load allows for the compressor to be efficiently operated.

Another benefit to speed control is that the range of temperatures in controlled environment is dramatically reduced when compared to conventional HVAC/R systems in which the compressor is either fully on or off. In conventional HVAC/R systems, in order to prevent frequent state changes between off and on, the control system works with a hysteresis characteristic. In such systems, temperature excursions correspond to the hysteresis. For example, in some systems the hysteresis of the system is 3 degrees. If the temperature is set to −5C, once the temperature of the environment is −5C, the compressor is turned off. However, because of the 3 degrees of hysteresis, the compressor will not be turned on again until the temperature of the environment is −2C. In contrast, in an HVAC/R system with a VFD controlling the compressor, the active control system incrementally increases and decreases the speed of the compressor to provide precise control of the temperature in the environment. As a result, there is no hysteresis, and, accordingly, significantly reduced trade-off between consistency of temperature and power consumption.

In the embodiment shown, the three-phase output of power supply 22 powers both the condenser fan 54 and the compressor motor 52 and both are operated together. The result is beneficial system cost savings by eliminating a power supply dedicated to the condenser fan 54. In addition, the system has speed control and the range of the speed control is unlimited for the one or more 3-phase motors and is limited at the low end of the range for the one or more 1-phase motors. While the discussion herein is generally directed to a system having a condenser fan 54 and a compressor motor 52, it is to be understood that the discussion applies to systems having one or more additional three-phase motors and/or one or more additional single-phase motors driven by power supply 22.

Conventional electromechanical controls knowledge might suggest that when a VFD is used with a compressor motor, the single-phase motor of the condenser fan is discarded and replaced with a three-phase motor compatible with the variable speed three-phase output of the power supply. In the system described and shown herein, because the condenser fan 54 does not need to have a three-phase motor, a less expensive single-phase motor is used for the condenser fan 54, and the three-phase power from power supply 22 is conditioned by phase change module 53.

As shown in FIG. 1, a phase change module 53 is connected between the VFD power supply 22 and condenser fan 54. Single-phase motors such as condenser fan 54 are not compatible with variable frequency and voltage operation. In the single-phase motor, a "new" phase is generated to be used with the single phase of the input power signal to create rotating magnetism to the armature to generate torque. For example, if the single-phase motor is a shaded pole motor, a shading ring serves as an inductance capable of storing a magnetic field and generating the "new" phase. If the single-phase motor is a permanent split capacitor motor, a capacitor provides a phase lead of current to one terminal relative to another. The power efficiency of the shading ring and the capacitor, however, is frequency dependent, and therefore these elements are tuned to the running frequency of the motor according to its application. At non-specified frequencies, the behavior of the motor and that of the new phase generating elements are inefficient and the motor torque suffers. In addition, the power output signal of the VFD has large transient voltage spikes at high frequencies (e.g. 2-6 KHz). These transients can exceed the brake down voltage of the new phase generating elements, and cause high current spikes which increase heat and reduce power efficiency of the motor and its components. Therefore, these motors are inefficient for use in a variable frequency drive scheme.

The preexisting single-phase motor of condenser fan 54 may be modified to operate efficiently in the variable frequency drive scheme of FIG. 1. The single-phase motor is similar to a three-phase motor where the first two poles carry the single phase of the power input, and the third pole receives the new phase generated by the inductive and capacitive elements. In HVAC/R system 200, the single-phase motor of condenser fan 54 receives two of the three phases generated by the power supply 22. In addition, the modified single-phase motor has its new phase generation elements replaced with elements which are compatible with the large transient voltage spikes of the VFD, such as those shown in FIG. 2. In one embodiment of phase change circuit 53, the modification of the single-phase motor includes replacing the run capacitor with two capacitors of twice the capacitance, in series. These capacitors are shown as 10MFD capacitors in FIG. 2. This increases the breakdown voltage while keeping the capacitance value, and therefore the tuning of the motor, unchanged. In addition, a capacitor with a ceramic composition and value in the range of 0.01 to 0.1MFD placed in parallel with the two run capacitors, also shown in FIG. 2, provides lower impedance to the high frequency switching transients created by the VFD. For example, in a single-phase motor a main winding may be in parallel with a series connected 5MFD run capacitor and auxiliary winding. The 5MFD run capacitor may be replaced with two series connected 10MFD capacitors in parallel with a 0.05MFD capacitor, as shown in FIG. 2.

Power supply 22 of power supply section 20 is configured to supply power to control module 55. The control module 55 is the system control electronics, which provides control signals to other HVAC/R system components and power supplies. For example, the control module 55 may control power supplies 22 and 26. In some embodiments, the control module 55 outputs an AC control signal, which is used with a relay to turn on or off the power supplies 22 and 26. In some embodiments, control module 55 is in communication with a user control panel, which the user activates, for example, to select a desired temperature. In some embodiments, the control module 55 is in communication with a thermostat. In the HVAC/R system 200, control module 55 operates with a 24V single-phase AC power supply, provided by power supply 24. In some embodiments, power supply 24 comprises a DC/AC inverter which receives the DC signal from power bus 15, and generates the 24V AC power supply for control module 55.

In some embodiments, power supply 24 comprises a switching type inverter which generates a pseudo-sine wave by chopping the DC input voltage into pulses. The pulses are used as square waves for a step-down transformer which is followed by a wave shaping circuit, which uses a filter network to integrate and shape the pulsating secondary voltage into the pseudo-sine wave.

Power supply 26 is configured to supply power to the motor 57 of blower 56. In some embodiments, blower 56 comprises a three-phase motor and power supply 26 is configured to generate a three-phase power supply signal. For reasons similar to those described above with regard to power supply 24 comprising a VFD to efficiently turn on compressor motor 52, power supply 26 may comprise a second VFD configured to efficiently turn on and turn off the motor 57 of the blower 56. In some embodiments, the second VFD is a 5hp VFD. In some embodiments, blower 56 may be operated independently from the compressor motor 52 and condenser fan 54. For example, a user may desire to have the blower 56 running and the compressor motor 52 and condenser fan 54 off As a result, because in some embodiments, VFD's are not suitable for abruptly changing loads, the blower 56 receives power from the second VFD of power supply 26.

Figure 3:
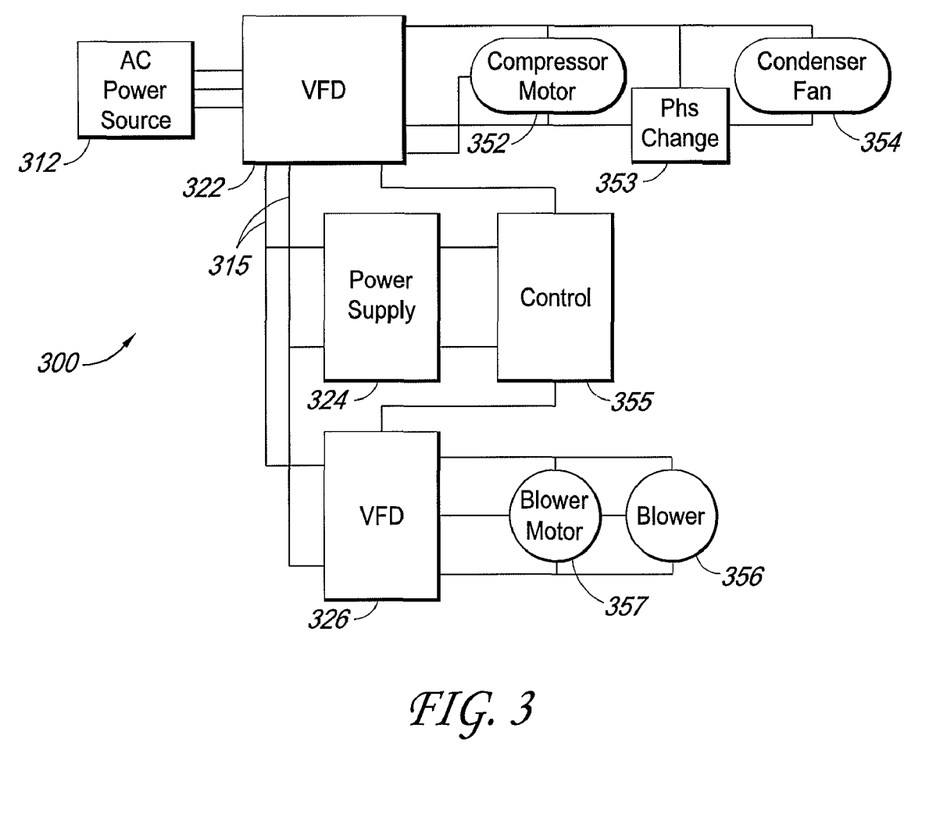
FIG. 3 is a block diagram illustrating an HVAC/R system according to one embodiment.

In some embodiments, HVAC/R system 200 is implemented as shown in HVAC/R system 300, shown in FIG. 3. In this embodiment, the rectifier 13 of FIG. 1 is included in the VFD power supply 322 of FIG. 3. An AC power source 312, which may be similar to AC power source 12 of FIG. 1, drives the VFD 322, which generates a substantially DC voltage for its own operation and for driving power bus 315. VFD 322 may have similar functionality as power supply 22 of FIG. 1. The other components shown in FIG. 3, DC power source 314, compressor motor 352, phase change circuit 353, condenser fan 354, power supply 324, control module 355, VFD power supply 326, and blower 356, may each have similar functionality to the corresponding components shown in FIG. 1, DC power source 14, compressor motor 52, phase change circuit 53, condenser fan 54, power supply 24, control module 55, power supply 26, and blower 56, respectively.

In another embodiment an HVAC/R system using a variable frequency drive (VFD) power supply as described above incorporates a pulsed operation control valve to control refrigerant flow to the evaporator from the condenser. The VFD powered HVAC/R system yields varying compressor-speeds resulting in variable refrigerant flows to the condenser and to the evaporator. However, conventional expansion devices such as capillary tubes or expansion valves (AEV or TEV) cannot handle or take advantage of varying refrigerant flows and hunt or flood, thereby reducing evaporator efficiency and system performance. In order to achieve desired advantages of such variable refrigerant flows, according to this embodiment, a pulsing refrigerant control valve is used to produce a full range of evaporator superheat control at all refrigerant flows without starving or flooding the evaporator. Such refrigerant control is especially important at lower refrigerant flow rates resulting from variable compressor speeds. Conventional expansion devices are designed to operate at full flow and are inefficient at lower flows, and fluctuating flows, again, starving and/or flooding the evaporator. The pulsing valve may be a mechanical valve such as described in U.S. Pat. Nos. 5,675,982 and 6,843,064 or an electrically operated valve of the type described in U.S. Pat. No. 5,718,125, the descriptions of which are incorporated herein by reference in their entireties. Such valves operate to control refrigerant-flow to the evaporator throughout the variable refrigerant flow ranges from the compressor and condenser.

FIG. 4 schematically illustrates a vapor compression section of an HVAC/R system of FIG. 3. A pulsed operation control valve 410 is installed in liquid refrigerant line 412 of a refrigerant loop piping that directs refrigerant from condenser 420 to evaporator 430. The other components are identified by the same reference numerals of FIG. 3.

Figure 5:
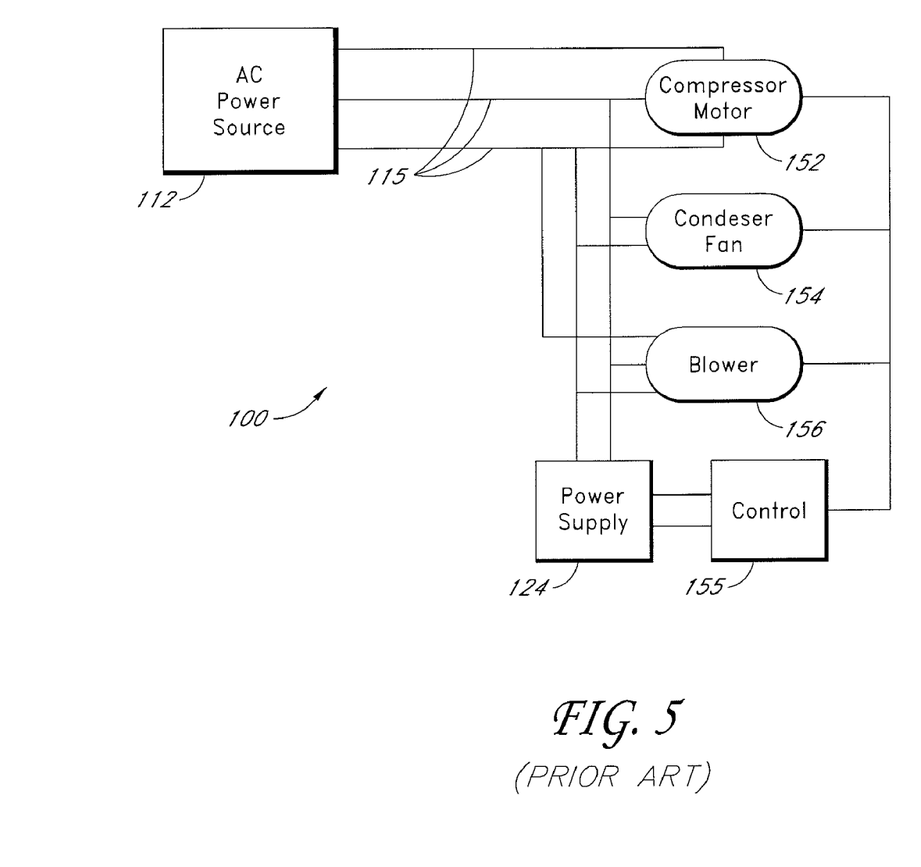
FIG. 5 is a block diagram illustrating a prior art HVAC/R system.

An existing HVAC/R system may be converted to function similarly to or identically to HVAC/R system 200. For example, prior art HVAC/R system 100 shown in FIG. 5 may be converted to operate and achieve the advantages previously described. To convert HVAC/R system 100, as shown in FIG. 5, and operate and achieve the advantages previously described, AC power source 112, compressor motor 152, condenser fan 154, blower 156, power supply 124, and control module 155 are disconnected from power bus 115. Referring also to FIG. 1, AC power source 112 is connected to power a power bus, such as power bus 15 with a rectifier, such as rectifier 13. A first power supply, such as power supply 22, is connected to the power bus, to compressor motor 152, and to condenser fan 154. A phase change circuit, such as phase change module 53, is connected between the first power supply and the condenser fan 154. A second power supply is connected to the power bus and to blower 156. Power supply 124 is replaced with a third power supply such as power supply 24, which is connected to the power bus and to control module 155.

While the above detailed description has shown, described, and pointed out novel features as applied to various embodiments, it will be understood that various omissions, substitutions, and changes in the form and details of the devices and processes illustrated may be made by those skilled in the art without departing from the spirit of the invention. For example, inputs, outputs, and signals are given by example only. As will be recognized, the present invention may be embodied within a form that does not provide all of the features and benefits set forth herein, as some features may be used or practiced separately from others. Moreover, it is to be understood that the power supply system described above for use in an HVAC/R system may be configured as an air conditioner, chiller, heat pump or refrigeration system, but is not limited thereto.

What is claimed is:

1. A heating, ventilation, air conditioning, and refrigeration (HVAC/R) system, comprising:
   a rectifier electrically connected to a first AC power source;
   a first DC power source;
   a first power supply electrically connected to the rectifier and the first DC power source and configured to output three-phase AC power at variable frequencies;
   a first three-phase AC motor electrically connected to the first power supply;
   a phase change module electrically connected to the first power supply and configured to receive three-phase AC power from the first power supply and output single-phase AC power;
   a single-phase evaporator fan electrically connected to the phase change module and configured to receive single-phase AC power from the phase change module; and
   a control module electrically connected to the first power supply and configured to provide control signals to the first power supply;
   a condenser;
   an evaporator; and
   a pulsed operation control valve configured to control the flow of refrigerant between the condenser and the evaporator.

2. The HVAC/R system of claim 1, further comprising:
   a second power supply electrically connected to the rectifier and the first DC power source and configured to output three-phase AC power at variable frequencies;
   a second three-phase AC blower motor electrically connected to the second power supply; and wherein the second power supply is electrically connected to the control module and configured to receive control signals from the control module.

3. The HVAC/R system of claim 1 wherein the first DC power source is at least one DC battery.

4. The HVAC/R system of claim 3, wherein the first power supply is a variable frequency drive and the second power supply is a variable frequency drive.

5. The HVAC/R system of claim 3, wherein the control module is electrically connected to a user control panel.

6. The HVAC/R system of claim 3, wherein the control module is electrically connected to a thermostat.

7. The HVAC/R system of claim 1, wherein the pulsed operation control valve is a mechanical valve.

8. The HVAC/R system of claim 1, wherein the pulsed operation control valve is an electronic valve.

9. A method of controlling a heating, ventilation, air conditioning, and refrigeration (HVAC/R) system, the method comprising:
providing DC power to a first power supply from a first power source;
providing DC power to the first power supply from a second power source;
providing three-phase AC power at a first frequency from the first power supply to a first three-phase AC motor;
providing single-phase AC power at the first frequency from a phase change module to a single-phase AC motor;
changing the speed of the first three-phase AC motor by providing a first control signal from a control module to the first power supply so that the first power supply provides AC power to the first three-phase AC motor at a second frequency; and
providing a pulsed operation control valve to control the flow of refrigerant to an evaporator.

10. The method of claim 9, further comprising:
providing DC power to a second power supply from the first power source;
providing DC power to the second power supply from the second power source;
providing three-phase AC power at a third frequency from the second power supply to a second three-phase AC motor; and
changing the speed of the second three-phase AC motor by providing a second control signal from the control module to the second power supply so that the second power supply provides AC power to the second three-phase AC motor at a fourth frequency.

11. The method of claim 9 wherein the second power source is at least one DC battery.

12. The method of claim 11 wherein the first power source is a rectifier electrically connected to an AC power source.

13. The method of claim 9, wherein the pulsed operation control valve is a mechanical valve.

14. The method of claim 9, wherein the pulsed operation control valve is an electronic valve.

15. The method of claim 11, wherein the first power supply is a variable frequency drive and the second power supply is a variable frequency drive.

16. The method of claim 11, wherein the first three-phase AC motor is a compressor motor.

17. The method of claim 16, wherein the second three-phase AC motor is a blower motor.

18. The method of claim 17, wherein providing the three-phase AC power at the first frequency causes the compressor motor to operate at a first compressor speed and providing the three-phase AC power at the second frequency causes the compressor motor to operate at a second compressor speed, different from the first compressor speed.

19. The method of claim 18, wherein the first compressor speed causes a first refrigerant flow to the pulsed operation control valve and the second compressor speed causes a second refrigerant flow to the pulsed operation control valve, different from the first refrigerant flow.

20. The method of claim 19, wherein the flow of refrigerant to the evaporator is substantially the same at the first compressor speed and at the second compressor speed.

* * * * *